United States Patent
Moore et al.

(10) Patent No.: US 8,053,941 B2
(45) Date of Patent: Nov. 8, 2011

(54) ENCAPSULATED OUTER STATOR ISOLATED ROTOR STEPPER MOTOR VALVE ASSEMBLY

(75) Inventors: Michael E. Moore, Haubstadt, IN (US);
Terry J. Stuckey, Evansville, IN (US);
Kawall Malhotra, Princeton, IN (US);
Randall R. Floyd, Evansville, IN (US);
John S. Bandas, Evansville, IN (US)

(73) Assignee: Nidec Motor Corporation, St. Louis, MO (US)

( * ) Notice: Subject to any disclaimer, the term of this patent is extended or adjusted under 35 U.S.C. 154(b) by 391 days.

(21) Appl. No.: 12/336,370

(22) Filed: Dec. 16, 2008

(65) Prior Publication Data

US 2010/0148605 A1  Jun. 17, 2010

(51) Int. Cl.
*H02K 5/10* (2006.01)
*H02K 5/12* (2006.01)

(52) U.S. Cl. ........... 310/86; 310/12.01; 310/14; 310/15; 310/80

(58) Field of Classification Search .............. 310/80, 310/86, 12.01, 14, 15; *H02K 5/10, 5/12*
See application file for complete search history.

(56) References Cited

U.S. PATENT DOCUMENTS

| | | | | |
|---|---|---|---|---|
| 3,288,073 A | * | 11/1966 | Pezzillo | ............... 417/357 |
| 4,404,483 A | | 9/1983 | Lebkuchner | |
| 4,433,947 A | | 2/1984 | Kratzer et al. | |
| 4,475,873 A | | 10/1984 | Jensen et al. | |
| 4,910,861 A | | 3/1990 | Dohogne | |
| 4,930,996 A | | 6/1990 | Jensen et al. | |
| 4,973,866 A | * | 11/1990 | Wang | ............... 310/49.03 |
| 4,973,872 A | | 11/1990 | Dohogne | |
| 4,981,420 A | | 1/1991 | Jensen et al. | |
| 5,028,218 A | | 7/1991 | Jensen et al. | |
| 5,052,656 A | * | 10/1991 | Katayama | ............... 251/129.11 |
| 5,431,340 A | * | 7/1995 | Schirpke et al. | ......... 237/12.3 B |
| 5,443,207 A | | 8/1995 | Genga | |
| 5,466,995 A | | 11/1995 | Genga | |
| 5,480,003 A | | 1/1996 | Hill et al. | |
| 5,622,221 A | | 4/1997 | Genga, Jr. et al. | |
| 5,644,178 A | | 7/1997 | Halm | |
| 5,651,425 A | | 7/1997 | Hill et al. | |
| 5,664,939 A | | 9/1997 | Giordani et al. | |
| 5,893,565 A | | 4/1999 | Hill et al. | |
| 6,076,368 A | | 6/2000 | Noble | |
| 6,272,870 B1 | | 8/2001 | Schaeffer | |
| 6,291,579 B1 | | 9/2001 | Kalck et al. | |
| 6,460,567 B1 | * | 10/2002 | Hansen et al. | ............... 137/554 |
| 6,775,468 B2 | | 8/2004 | Zinke et al. | |
| 6,856,055 B2 | | 2/2005 | Michaels et al. | |
| 6,857,332 B2 | * | 2/2005 | Pfister | ............... 74/89.34 |
| 7,048,495 B2 | | 5/2006 | Osgood | |
| 7,074,019 B2 | | 7/2006 | Knoll | |
| 2004/0070295 A1 | * | 4/2004 | Ohta et al. | ............... 310/83 |
| 2005/0074390 A1 | * | 4/2005 | Tour et al. | ............... 423/447.1 |
| 2005/0258714 A1 | * | 11/2005 | Henderson et al. | ............... 310/328 |
| 2005/0264113 A1 | * | 12/2005 | Suzuki et al. | ............... 310/80 |
| 2007/0237660 A1 | * | 10/2007 | Akiyoshi | ............... 417/423.11 |
| 2010/0148605 A1 | * | 6/2010 | Moore et al. | ............... 310/86 |

* cited by examiner

Primary Examiner — Quyen Leung
Assistant Examiner — John K Kim
(74) Attorney, Agent, or Firm — Hovey Williams LLP

(57) ABSTRACT

An electric motor assembly includes a rotor rotatable about an axis and a stator spaced radially away from the rotor. An isolation housing, configured to permit magnetic flux to flow therethrough between the rotor and the stator, is disposed between the rotor and the stator and defines an internal rotor chamber, in which the rotor is located. The isolation housing fluidly isolates the internal rotor chamber from the stator. An encapsulating cover is provided that radially and axially surrounds the stator. The cover is formed of a resin material and bonds the stator to the isolation housing to prevent relative movement therebetween.

17 Claims, 4 Drawing Sheets

ENCAPSULATED OUTER STATOR ISOLATED ROTOR STEPPER MOTOR VALVE ASSEMBLY

BACKGROUND OF THE INVENTION

1. Field of the Invention

The present invention relates generally to an electric motor assembly. More specifically, the present invention concerns an electric motor assembly that is particularly useful in actuating a valve body within a pressurized working fluid conduit, with the motor assembly including an isolation housing in which the rotor is located, with the housing serving to fluidly isolate the stator from the rotor and from any contact with the working fluid.

2. Discussion of the Prior Art

Those of ordinary skill in the art will appreciate that an electric motor, such as a linear stepper motor, can be used for many different applications, one of which involves shifting a valve body of a valve assembly to control the flow of a working fluid within a system. It is common to use such a stepper motor controlled valve assembly to control the flow of a refrigerant with a cooling system, and examples of such cooling systems are disclosed in U.S. Pat. No. 6,076,368 ("the '368 patent") and U.S. Pat. No. 6,272,870 ("the '870 patent").

When such a motor controlled valve system has been used in the past, a conventional linear stepper motor has been enclosed inside of a welded housing in order to seal the coolant inside the system and prevent it from leaking out to the environment. Traditionally, such a welded housing has included a steel container bowl brazed to a threaded brass connector for associating the motor control with the valve assembly. In addition, once a conventional motor is placed within the steel housing, a top cover has been welded onto the steel housing and wiring terminals, such as glass beads, have been incorporated into the cover so that wiring leads can be connected to power and control sources. In such a prior art assembly, the entire motor assembly is disposed within the coolant environment and all of the components are therefore exposed to the working fluid.

While such conventional systems have been satisfactory in some respects, those of ordinary skill in the art will also appreciate that such a complex housing arrangement has resulted in an expensive construction with poor reliability, as the multitude of connections, including glass beads and welds, often become leak points for the pressurized refrigerant. The disadvantages of multiple leak points are typically exacerbated by the fact that many of these assemblies are used in systems that experience high vibration, such as a cooling assembly on a refrigerated truck. Moreover, because the entire motor has been placed within the welded housing, a small motor has been required in order to maintain an acceptable overall footprint, a design constraint that has limited the available motor power for evolving applications.

As refrigerants or other working fluids are improved, or as new substances are mandated by law, the operating pressure of the fluid in newer systems is often significantly higher than in previous iterations of such systems. For example, the new refrigerant R-410-A requires an operating pressure that is between about 50% and 70% higher than that of the previous refrigerant R-22. Such an increase in the operating pressure of a conventional system increases the likelihood of the working fluid leaking out to the environment, and will require more powerful motors than can currently be incorporated into the footprint provided by the welded housing.

The prior art simply does not include an electric motor assembly for use in a valve assembly that will satisfactorily seal the pressurized working fluid within the system and that can provide sufficient power as operating pressures increase.

SUMMARY

According to one aspect of the present invention, an electric motor assembly is particularly configured for use with a pressurized fluid. The inventive motor assembly provides an isolation housing disposed between a rotor and a stator, wherein the rotor is located within an internal rotor chamber defined by the isolation housing and the stator is fluidly isolated from both the chamber from any pressurized fluid within the system. Such a construction eliminates the need for a welded outer shell, consequently eliminating all welding leak points that could otherwise allow the pressurized fluid to escape out into the atmosphere.

Furthermore, the disposition of the stator outside of the confined space of the isolation housing allows for a larger stator, and consequently a more powerful electric motor, to be used in the same overall footprint compared to prior art systems. The inventive motor assembly also considerably reduces both component count and assembly time compared to prior art assemblies. Finally, an encapsulating cover can be incorporated to secure the stator to the isolation housing, providing a clean aesthetic appearance and protecting assembly elements against loosening from operational vibration while providing sufficient heat transfer such that the stator remains at an appropriate operating temperature.

According to one aspect of the present invention, an electric motor assembly is provided that includes a rotor rotatable about an axis and a stator spaced radially away from the rotor, with the stator presenting an outer circumferential surface and axial margins. An isolation housing is disposed between the rotor and the stator and defines an internal rotor chamber, in which the rotor is located. The isolation housing is configured to permit magnetic flux to flow therethrough between the rotor and the stator. The isolation housing is also configured for attachment to a pressurized fluid conduit, with the isolation housing fluidly isolating the internal rotor chamber from the stator. In addition, the motor assembly includes an encapsulating cover radially and axially surrounding the stator to overlie the outer circumferential surface and axial margins of the stator. The cover bonds the stator to the isolation housing to prevent relative movement therebetween, and the cover is formed of a resin material.

Another aspect of the present invention concerns a valve assembly for controlling pressurized fluid flow along a conduit. The valve assembly includes a rotor rotatable about an axis and a stator spaced radially away from the rotor. An isolation housing is disposed between the rotor and the stator and defines an internal rotor chamber, in which the rotor is located. The isolation housing is configured to permit magnetic flux to flow therethrough between the rotor and the stator. The isolation housing is also configured for operable attachment to the conduit, with the isolation housing fluidly isolating the internal rotor chamber from the stator. In addition, the valve assembly includes a shaft disposed along the axis, wherein the shaft is operable to shift axially between an extended position and a retracted position, with rotation of the rotor causing axial shifting of the shaft. The shaft carries a valve body that is shiftable into and out of the fluid conduit as the shaft shifts between the extended position and the retracted position. The isolation housing includes a valve body chamber fluidly connectable to the fluid conduit, and the shaft projects into the valve body chamber, with the valve body being located within the valve body chamber when the shaft is in the retracted position.

This summary is provided to introduce a selection of concepts in a simplified form that are further described below in the detailed description of the preferred embodiments. This summary is not intended to identify key features or essential features of the claimed subject matter, nor is it intended to be used to limit the scope of the claimed subject matter.

Various other aspects and advantages of the present invention will be apparent from the following detailed description of the preferred embodiments and the accompanying drawing figures.

BRIEF DESCRIPTION OF THE DRAWING FIGURES

A preferred embodiment of the present invention is described in detail below with reference to the attached drawing figures, wherein.

Figure 1:
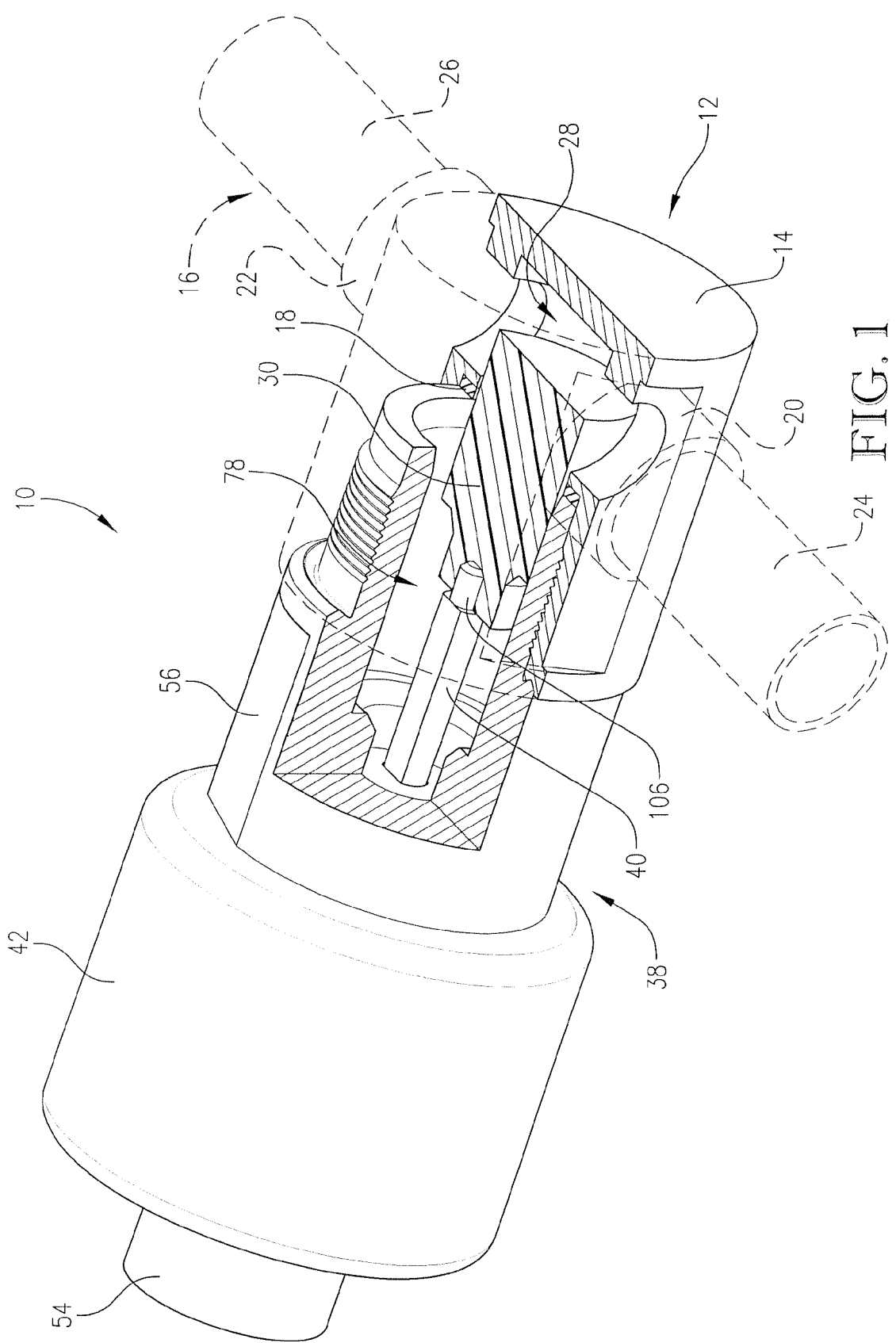
FIG. 1 is a perspective, partial cutaway view of an electric motor assembly constructed in accordance with the principles of a preferred embodiment of the present invention, depicting an encapsulating cover surrounding the motor assembly, and further depicting the motor assembly in an operational environment including a valve housing with a valve body therein and fluid conduit connections.

The drawing figures do not limit the present invention to the specific embodiments disclosed and described herein. The drawings are not necessarily to scale, emphasis instead being placed upon clearly illustrating the principles of the preferred embodiments.

DETAILED DESCRIPTION OF THE PREFERRED EMBODIMENTS

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments.

With initial reference to FIG. 1, an electric motor assembly 10 constructed in accordance with a preferred embodiment of the present invention is depicted in connection with a valve assembly 12. The valve assembly 12 broadly includes a valve housing 14 that is connectable to a fluid conduit 16. A sealing element 18, such as an O-ring, is disposed between the valve housing 14 and the electric motor assembly 10. The valve housing 14 includes flange portions 20, 22 that are configured for attachment to an inlet portion 24 and an outlet portion 26, respectively, of the conduit 16. The inlet portion 24 and the outlet portion 26 are in fluid communication with one another via a passageway 28 defined within the valve housing 14.

A valve body 30, such as a piston, is disposed within the valve housing 14 and is configured for relative movement therein such that at least a portion of the valve body 30 is movable into and out of the passageway 28. The valve body 30 is operably associated with the motor assembly 10 such that actuation of the motor assembly 10 shifts the valve body 30 within the valve housing 14, as is discussed in more detail below. It is noted that while the valve body 30 is depicted in FIG. 1 as a piston having a generally cylindrical shape, the use of other suitable piston shapes or of valve bodies that are not pistons are both clearly within the ambit of the present invention. In this way, movement of the valve body 30 can increase or restrict the allowable flow rate of a fluid through the conduit 16 between the inlet portion 24 and the outlet portion 26, as will be readily understood by one of ordinary skill in the art upon review of this disclosure.

The conduit 16 may be part of a cooling or refrigeration system, such that the fluid carried within the conduit 16 is a refrigerant. Examples of such cooling systems suitable for use with the motor assembly 10 and the valve assembly 12 described herein are disclosed in U.S. Pat. No. 6,076,368 ("the '368 patent") and U.S. Pat. No. 6,272,870 ("the '870 patent"). Both the '368 patent and the '870 patent, which each have the same assignee of record as the present application, are hereby incorporated by reference in their entirety to the extent not inconsistent with the present disclosure.

Figure 2:
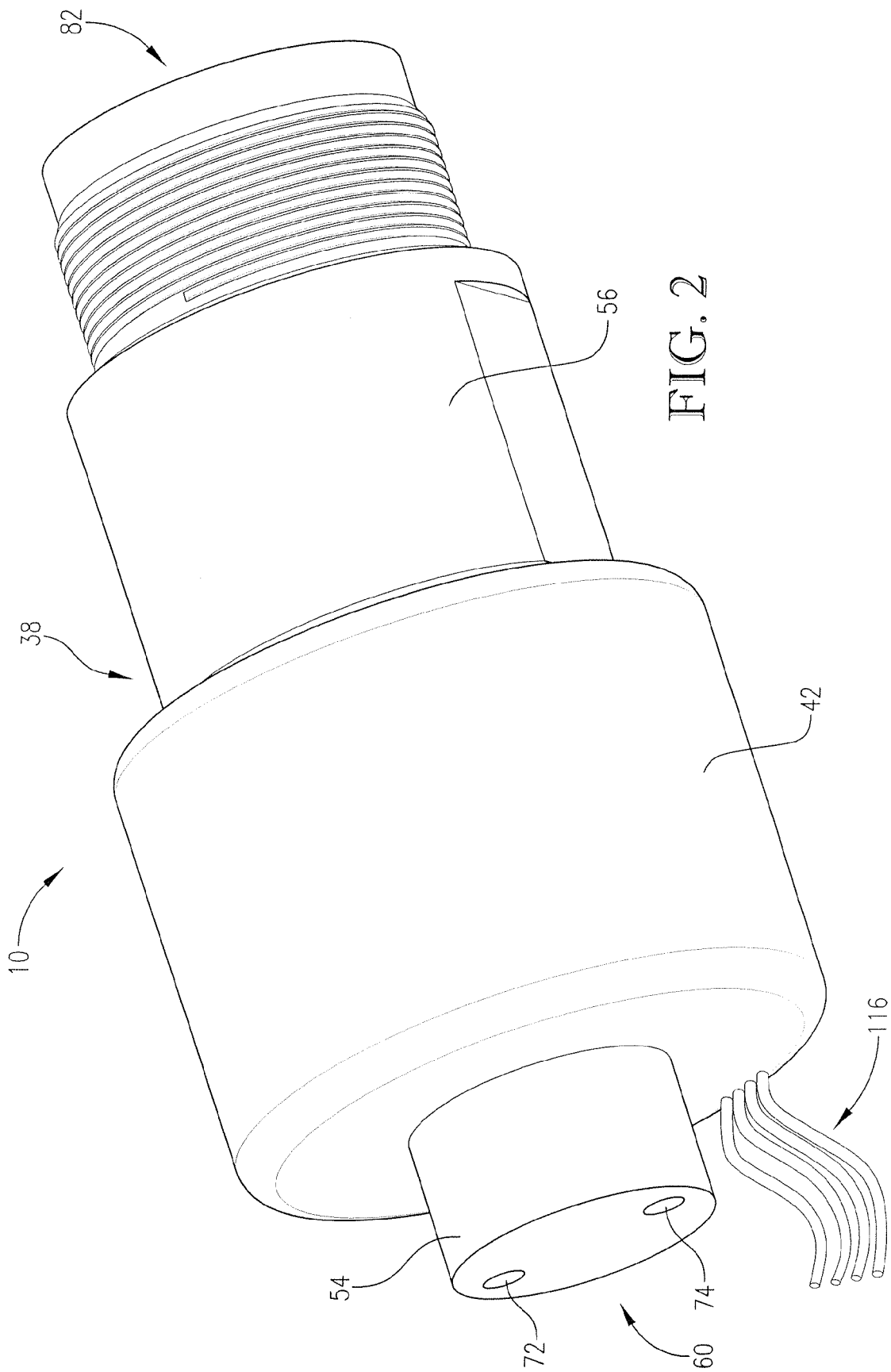
FIG. 2 is a perspective view of the electric motor assembly of FIG. 1, shown from the opposite vantage point, depicting an axial margin of an isolation housing and motor wiring extending out through the encapsulating cover, illustrated without the operational environment shown in FIG. 1.
Figure 3:
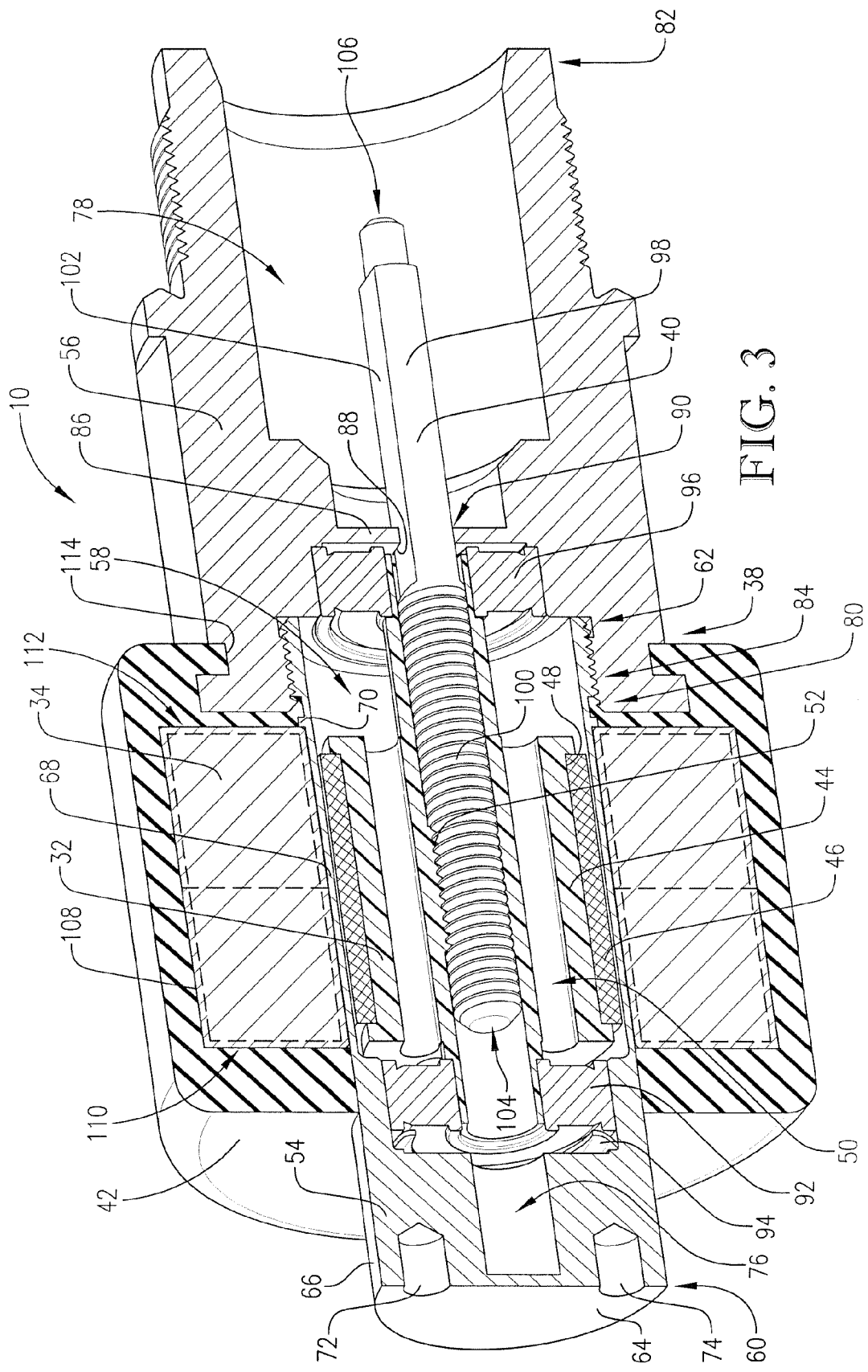
FIG. 3 is a partial cutaway, perspective view of the electric motor assembly of FIG. 1, depicting internal details of construction of the motor assembly elements and the encapsulating cover.
Figure 4:
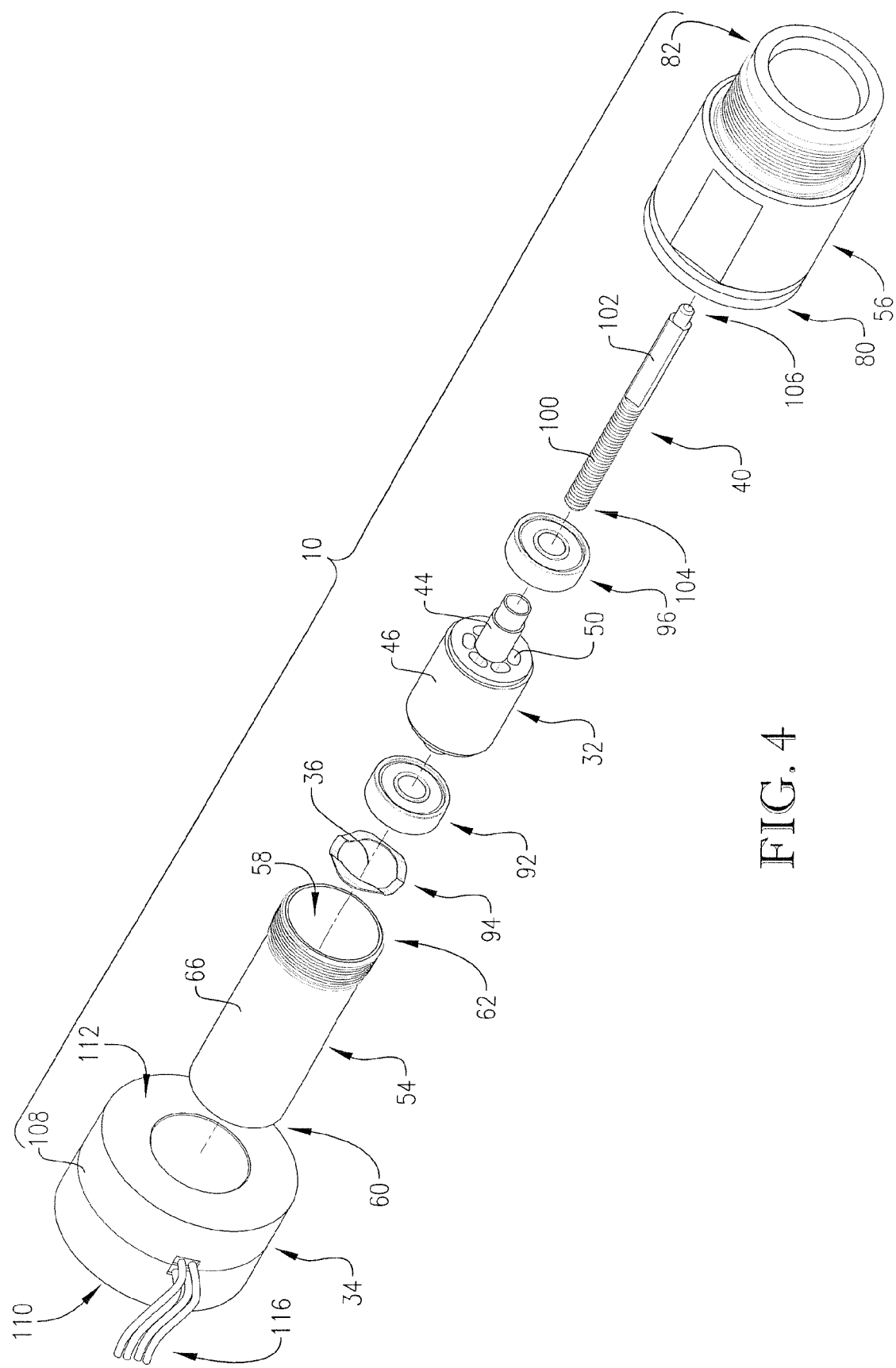
FIG. 4 is an exploded, perspective view of the electric motor assembly of FIG. 1, depicting individual elements of the motor assembly, illustrated without the encapsulating cover shown in FIG. 1.

With continued reference to FIG. 1, and turning also to FIGS. 2-4, the elements and construction of the motor assembly 10 are described in greater detail. As noted above, the motor assembly 10 is connectable to the valve assembly 12 and is operably associated with the valve body 30 to move the valve body 30 within the valve assembly 12. In the case of an application of the motor assembly 10 and the valve assembly 12 within a cooling system, the motor assembly 10 is operable to control the flow rate of the cooling fluid through the valve housing 14, and thus through the conduit 16, in order to regulate temperature associated with such a cooling system.

With particular reference to FIG. 3, the motor assembly 10 broadly includes a rotor 32 and a stator 34, with the rotor 32 being rotatable about an axis 36. The motor assembly 10 includes an isolation housing 38 that is disposed between the rotor 32 and the stator 34, and within which the rotor 32 is located. The motor assembly 10 of the depicted embodiment also includes a shaft 40 associated with the rotor 32, as explained in detail below. Similar to the rotor 32, the shaft 40 is disposed along the axis 36. In addition, the motor assembly 10 further includes an encapsulating cover 42 that surrounds the stator 34 and bonds the stator 34 to the isolation housing 38 to prevent any relative movement therebetween.

The rotor 32 of the depicted embodiment comprises a radially inner core element 44 and a radially outer element 46 radially surrounding and attached to at least a portion of the core element 44. The core element 44 presents a radially inner periphery 48 that is generally cylindrical in shape and concentric about the axis 36. The core element 44 also includes a plurality of axially extending holes 50 extending therethrough, with each hole 50 being spaced radially outwardly from the inner periphery 48. The radially inner periphery 48 of the core element 44 includes a threaded portion 52, with the threaded portion 52 cooperating with the shaft 40 to linearly shift the shaft 40 as a result of rotation by the rotor 32, as described in detail below. In one embodiment, the core element 44 is formed of a synthetic resin material that is non-magnetic, although other suitable materials are clearly within the ambit of the present invention.

The radially outer element 46 of the rotor 32 radially surrounds at least a portion of the core element 44 and is spaced radially outwardly from the plurality of holes 50. The radially outer element 46 is formed of a magnetic material in order to cooperate with the stator 34 to produce rotational movement of the rotor 32. In one embodiment, the magnetic material of the radially outer element 46 includes neodymium, although other magnetic materials could alternatively be used, as will be readily appreciated by one of ordinary skill in the art.

The isolation housing 38 of the depicted embodiment comprises a generally cylindrical sleeve portion 54 threadably connected to a connecting bell portion 56. The sleeve portion 54 defines an internal rotor chamber 58, within which the rotor 32 is located, and presents first and second axial margins 60, 62. An end wall 64 radially spans the first axial margin 60 to seal the first axial margin 60 of the sleeve portion 54 and an end of the rotor chamber 58. The sleeve portion 54 further presents a radially outermost surface 66, part of which defines a thin wall portion 68 through which magnetic flux can pass between the rotor 32 and the stator 34. While the sleeve portion 54 allows magnetic flux to pass therethrough, the sleeve portion 54 maintains the rotor 32 and the stator 34 in fluid isolation from one another, as explained in detail below. In one embodiment, the sleeve portion 54 is formed of stainless steel, although the use of other suitable materials, particularly nonmagnetic materials, is clearly within the ambit of the present invention.

The radially outermost surface 66 of the sleeve portion 54 is substantially cylindrical and smooth such that the stator 34 can be positioned around the sleeve portion 54 during construction of the motor assembly 10. An upstanding ridge 70 extends radially outwardly from the surface 66 such that the stator 34 is disposed adjacent the ridge 70 to position the stator 34 in general axial alignment with the rotor 32, as shown in FIG. 3.

The second axial margin 62 of the sleeve portion 54 is substantially open and threadably secured to the bell portion 56, as described in detail below. A pair of axially extending depressions 72, 74 extend inwardly from the end wall 64 toward the rotor chamber 58. The depressions 72, 74 facilitate the use of a tool, such as a spanner wrench, to rotate the sleeve portion 54 relative to the bell portion 56 to secure the sleeve portion 54 to the bell portion 56. An axially extending recess 76 is disposed along the axis 36 and extends outwardly from the rotor chamber 58 toward the end wall 64. The recess 76 is sized to accommodate a portion of the shaft 40, as explained in detail below.

The bell portion 56 defines an internal valve body chamber 78, within which the valve body 30 may be located, and presents first and second axial margins 80, 82. The first axial margin 80 of the bell portion 56 is threadably secured to the second axial margin 62 of the sleeve portion 54 to form a junction 84 therebetween. The second axial margin 82 of the bell portion 56 is connectable to the valve housing 14, as depicted in FIG. 1. In one embodiment, the bell portion 56 is formed of brass, although other suitable materials are clearly within the ambit of the present invention.

The bell portion 56 also includes radially inwardly extending wall structure 86 that forms an endshield of the motor assembly 10 to generally separate the rotor chamber 58 from the valve body chamber 78. The wall structure 86 also includes a flat surface 88 adjacent a shaft passage 90 that is aligned with and spaced generally parallel from the axis 36. The shaft passage 90 allows the shaft 40 to extend axially between the rotor chamber 58 and the valve body chamber 78 and may also permit pressurized fluid to enter into the rotor chamber 58 from within the valve housing 14, which is in fluid communication with the conduit 16. In this way, the rotor 32 may be exposed to pressurized fluid of the system, but the isolation housing 38 keeps the stator 34 (and the environment) isolated from pressurized fluid.

Additional components of the illustrated embodiment contribute to the advantageous operation of the motor assembly 10. A first rotational bearing 92 is disposed within the rotor chamber 58, positioned between the sleeve portion 54 and a portion of the rotor core 44. The first bearing 92 is further positioned adjacent a solid portion of the first margin 60 of the sleeve portion 54, with a wave spring 94 disposed axially between the first margin 60 and the first bearing 92. The first bearing 92 at least partially rotationally supports the rotor 32 within the rotor chamber 58. A second rotational bearing 96 is also disposed within the rotor chamber 58, but positioned between the bell portion 56 and a portion of the rotor core 44. The second bearing 96 is further positioned adjacent the wall structure 86 of the bell portion 56, and at least partially rotationally supports the rotor 32 within the rotor chamber 58. It is specifically noted, however, that the second bearing 96 could optionally be positioned within the sleeve portion 54 adjacent the second margin 62 thereof in an alternate embodiment (not shown) without departing from the teachings of the present invention.

The shaft 40 is disposed along the axis 36, extending within both the rotor chamber 58 and the valve body chamber 78, and presents a radially outer periphery 98. The shaft 40 is linearly movable along the axis 36 and cooperates with the rotor 32 such that rotation of the rotor 32 causes the shaft 40 to move linearly between an extended position and a retracted position. By the extended position, it is meant that the shaft 40 is disposed as far as it can be toward the second margin 82 of the bell portion 56. By the retracted position, it is meant that the shaft 40 is disposed as far as it can be toward the first margin 60 of the sleeve portion 54.

In the depicted embodiment, the outer periphery 98 of the shaft 40 presents an externally threaded portion 100 that cooperates with the internally threaded portion 52 of the rotor 32 such that rotation of the rotor 32 causes the shaft 40 to shift linearly in an axial direction. In addition, the outer periphery 98 of the shaft 40 presents a substantially flat portion 102 that cooperates with the flat surface 88 of the wall structure 86 of the bell portion 56 to slide axially therealong and prevent rotation of the shaft 40. The shaft 40 further presents first and second axial margins 104, 106, with the second margin 106 being configured for attachment to the valve body 30.

It is noted that when the shaft 40 is in the retracted position, the first margin 104 may be disposed within the shaft recess 76 of the sleeve portion 54, and the valve body 30 will be substantially entirely received within the valve body chamber 78 of the bell portion 56. In this position, fluid flow through the conduit 16 is at a maximum rate. On the other hand, when the shaft 40 is in the extended position, then the valve body 30 will be substantially entirely disposed within the valve housing to substantially restrict fluid flow through the conduit 16.

Finally, with continued reference to FIG. 3, the encapsulating cover 42 is described in more detail. As described briefly above, the cover 42 surrounds the stator 34 to both seal and bond the stator 34 to the isolation housing 38. In particular, it is noted that the stator 34 presents an outer circumferential surface 108 and axial margins 110, 112. The cover 42 both radially and axially surrounds the stator 34 to overlie the circumferential surface 108 and both axial margins 110, 112. Furthermore, the bell portion 56 includes a radially inwardly extending groove 114 extending along the outer circumference of the bell portion 56. The cover 42 extends into the groove 114 to prevent axial movement of the stator 34 relative to the isolation housing 38. The cover 42 also overlies the junction 84 between the sleeve portion 54 and the bell portion

56, thereby preventing any potential leakage of pressurized fluid from within the isolation housing 38 through the junction 84.

As shown in FIGS. 2 and 4, the motor assembly 10 also includes wiring 116 that connects to the stator 34 to provide power and control signals to the motor assembly 10. In particular, when the motor assembly 10 comprises a stepper motor, the wiring 116 may transmit control signals from a microcontroller (not shown) in order to precisely affect movement of the rotor 32 and consequently the shaft 40 and the valve body 30. The encapsulating cover 42 overlies the connection between the wiring 116 and the stator 34, adding security to this connection against any loosening due to vibration within the system.

In one embodiment, the encapsulating cover 42 is formed of a resin material. In particular, the depicted cover 42 is formed of a two-part epoxy, although other suitable materials are clearly within the ambit of the present invention.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and access the reasonably fair scope of the present invention as pertains to any apparatus not materially departing from but outside the literal scope of the invention set forth in the following claims.

What is claimed is:

1. An electric motor assembly comprising:
    a rotor rotatable about an axis;
    a stator spaced radially away from the rotor, with the stator presenting an outer circumferential surface and axial margins;
    an isolation housing disposed between the rotor and the stator and defining an internal rotor chamber, in which the rotor is located,
    said isolation housing being configured to permit magnetic flux to flow therethrough between the rotor and the stator,
    said isolation housing being configured for attachment to a pressurized fluid conduit,
    said isolation housing fluidly isolating the internal rotor chamber from the stator; and
    an encapsulating cover radially and axially surrounding the stator to overlie the outer circumferential surface and axial margins of the stator,
    said cover bonding the stator to the isolation housing to prevent relative movement therebetween,
    said cover being formed of a resin material,
    said isolation housing comprising a generally cylindrical sleeve portion,
    said sleeve portion presenting first and second axial margins,
    said isolation housing including an end wall radially spanning the first margin to substantially seal an end of the rotor chamber,
    said second margin being substantially open,
    said isolation housing further comprising a connecting bell portion,
    said bell portion presenting first and second axial margins,
    said first margin of the bell portion being secured to the second margin of the sleeve portion to define a junction therebetween,
    said second margin of the bell portion being configured for operable attachment to the pressurized fluid conduit.

2. The electric motor assembly as claimed in claim 1; and
    a shaft disposed along the axis,
    said shaft being operable to shift axially between an extended position and a retracted position, with rotation of the rotor causing axial shifting of the shaft.

3. The electric motor assembly as claimed in claim 2,
    said rotor and said shaft being threadably interconnected so as to translate rotational movement of the rotor to axial linear movement of the shaft.

4. The electric motor assembly as claimed in claim 2,
    said shaft carrying a valve body that is shiftable into and out of the fluid conduit as the shaft shifts between the extended position and the retracted position,
    said isolation housing including a valve body chamber fluidly connectable to the fluid conduit,
    said shaft projecting into the valve body chamber, with the valve body being located within the valve body chamber when the shaft is in the retracted position.

5. The electric motor assembly as claimed in claim 1,
    said rotor comprising a radially inner element and a radially outer element,
    said radially outer element being formed at least in part of magnetic material,
    said radially inner element being formed of synthetic resin material,
    said radially inner element presenting a radially inner periphery, a portion of which being internally threaded; and
    a shaft disposed along the axis,
    said shaft presenting a radially outer periphery, a portion of which being externally threaded,
    said radially inner element and said shaft cooperating such that rotation of the rotor relative to the shaft moves the shaft linearly along the axis between a retracted position and an extended position.

6. The electric motor assembly as claimed in claim 5,
    said magnetic material including neodymium.

7. The electric motor assembly as claimed in claim 1; and
    a bearing rigidly fixed within the sleeve portion,
    said bearing at least partially rotationally supporting the rotor.

8. The electric motor assembly as claimed in claim 1,
    said sleeve portion being formed of a non-magnetic material.

9. The electric motor assembly as claimed in claim 8,
    said sleeve portion being formed of stainless steel.

10. The electric motor assembly as claimed in claim 1, said cover overlying the junction between the sleeve portion and the bell portion.

11. The electric motor assembly as claimed in claim 10,
    said bell portion including radially extending wall structure forming an endshield of the electric motor.

12. The electric motor assembly as claimed in claim 11; and
    a bearing rigidly fixed within the bell portion,
    said bearing at least partially rotationally supporting the rotor.

13. The electric motor assembly as claimed in claim 1,
    said bell portion including radially extending wall structure having a substantially flat surface aligned with and spaced generally parallel from the axis; and
    a shaft disposed along the axis,
    said shaft being configured to cooperate with the rotor such that rotation of the rotor relative to the shaft moves the shaft linearly along the axis between a retracted position, whereby the shaft is positioned axially closest to the first margin of the sleeve portion, and an extended position, whereby the shaft is positioned axially furthest from the first margin of the sleeve portion, said shaft presenting a radially outer periphery, a portion of which being substantially flat, said flat surface of the bell portion bearing against the corresponding flat portion of the shaft to thereby cooperatively prevent rotation of the shaft relative to the bell portion.

14. The electric motor assembly as claimed in claim 13, said sleeve portion including a generally solid segment along the first margin thereof with an extended recess extending axially therein configured to receive a portion of the shaft when the shaft is in the retracted position.

15. The electric motor assembly as claimed in claim 1, said motor assembly being configured as a stepper motor.

16. The electric motor assembly as claimed in claim 1; and motor wiring connected to and extending from the stator to provide power and control of the assembly, said cover encasing the connection between the motor wiring and the stator.

17. The electric motor assembly as claimed in claim 16, said cover being formed of a two-part epoxy.

* * * * *